Figure 1:
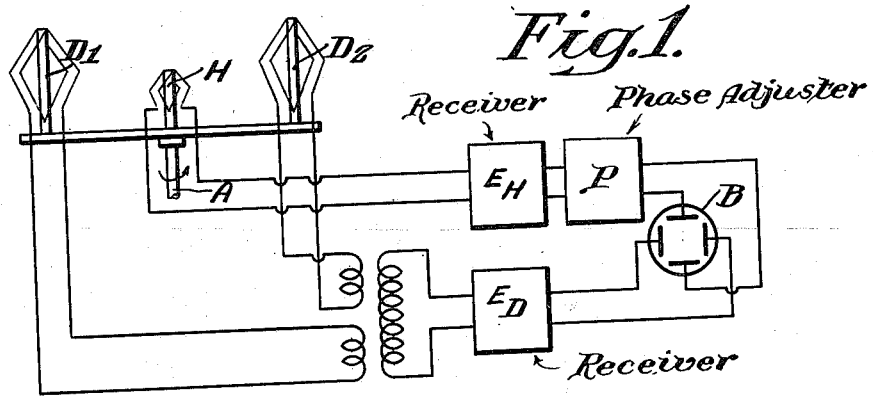

Sept. 29, 1942.  W. RUNGE  2,297,249
DOUBLE FRAME DIRECTION FINDER WITH VISUAL INDICATOR
Filed May 18, 1938

Inventor
Wilhelm Runge
By
Attorney

Patented Sept. 29, 1942

2,297,249

UNITED STATES PATENT OFFICE 2,297,249

DOUBLE FRAME DIRECTION FINDER WITH VISUAL INDICATOR

Wilhelm Runge, Berlin-Wannsee, Germany; vested in the Alien Property Custodian

Application May 18, 1938, Serial No. 208,562
In Germany June 12, 1937

8 Claims.  (Cl. 250—11)

For direction finding that is free of night effects, it is old to employ double frame finders consisting of two frames placed parallel to each other at a certain distance and connected in opposition, and which can be turned about an axis situated in the center between the frames. In addition to these frames, an auxiliary frame is required disposed parallel to the two main frames. It has been suggested to transmit the visual indication of the bearing values of such a direction finder, as well as the potentials of the main frames and of the auxiliary frame, to a receiver, furthermore to reverse periodically the polarity of one of the two potentials, and to switch in reverse with the reversing of the tubes and in synchronism therewith an instrument placed in the output of the receiver. Such a system is described in a copending application of Runge and Gothe, Serial No. 202,036, filed April 14, 1938, and entitled "Direction finder." The several receiving minima which are hereby obtained at a turning of the frame at 360° include the minimum which gives the correct bearing value, and this minimum is ascertained by tilting the arrangement to and fro and by observing the direction of the deviation of the pointer. The object of the present invention is to provide an unequivocal visual indication for a double frame direction finder in which the reading is substantially simplified in that the correct minimum instead of having to be chosen from four minima can be obtained from two minima while the other two minima of the double frame direction finder are no longer indicated at all, owing to the particular construction of the indicating arrangement. Furthermore, the structurally inconvenient reversing means are omitted so that the safety of operation is hereby essentially enhanced.

In accordance with the present invention, the potentials of the double frame on the one hand and those of the auxiliary frame on the other hand are applied to two separate receivers whose output potentials are impressed upon the two pairs of plates of a Braun tube, or upon a dynamometer.

It is old to impress the potentials of a single frame antenna and of a linear auxiliary antenna upon separate receivers whose outputs are placed at the pairs of plates of a Braun tube. In applying the indication method used in this case to a double frame direction finder, the particular effect which could not be foreseen is obtained that in the indication in a double frame two minima among the possible four minima are omitted from the very beginning, so that for the unequivocal measurement it is necessary to choose only from the two remaining minima. The correct minimum is obtained by a to and fro tilting of the arrangement and by observing the direction of the deviation of the indicating instrument. Thus the visual indication method, according to the present invention, provides a direct reading in case of double frame direction finders that is extremely simplified as compared with the known and already proposed method without affecting in any degree the certainty of the reading.

Figure 2:
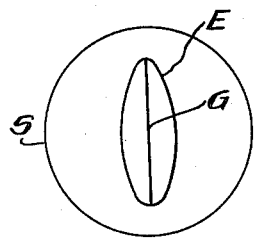

The present invention will now be explained in greater detail by reference to the accompanying figures, in which Fig. 1 is a diagram illustrating the essentials of my invention; Fig. 2 is a representation of the type of indication obtained; and Fig. 3 is a curve representing the response characteristics of the double and auxiliary frame antennas.

Referring to Figure 1 there is shown a double frame direction finder consisting of the two main frames $D_1$ and $D_2$ and auxiliary frame H. The entire arrangement can be turned about the axis A. The potentials of the two main frames $D_1$ and $D_2$ are connected in opposition and are applied to a receiver $E_D$. The auxiliary frame H is connected to the second receiver $E_H$ through a phase adjusting device P. The outputs of the two receivers are connected to the two pairs of plates of a Braun tube B. As already pointed out, a dynamometer may also be employed in place of the Braun tube. If the two receiver output potentials are the same or in opposite phase, there will be obtained in either case on the screen S of the Braun tube shown in Fig. 2 a straight line G whose direction depends on the relative amplitudes of the two output potentials. But if the potentials have not the same phase, an ellipse E will be obtained whose main axis has again at a minimum of the one deviation potential a definite direction indicating the minimum of the bearing. Care must simply be taken that the output potentials of the two receivers are not displaced by 90°, since in this case there will be obtained, at equal amplitudes of the deviation potentials, a circle on the screen of the Braun tube from which no preferred direction can be read. Hence it is advisable to insert phase displacement means P in the one or in both lines between receiver and Braun tube. But as can be readily seen, the arrangement is not at all sensitive to slight variations in the phase at approximate phase equality or phase opposition. Means may also be provided for controlling the relative amplitudes, but this is not absolutely necessary as can be readily seen.

Figure 3:
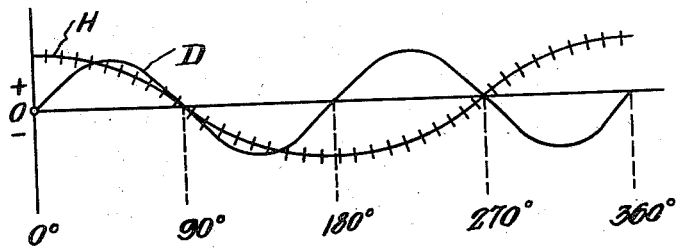

The functioning of the indicating arrangement can be clearly seen from Fig. 3 showing the resultant potential D of the two main frames and the potential H of the auxiliary frame in relation to the angular displacement of the frame arrangement. If the transmitter whose bearing is to be ascertained lies in the plane of all frames (this angle is designated by 0°) the potential of the auxiliary frame is a maximum, but the resultant potential of the main frames is zero since these frames are connected in opposition. If the arrangement is then turned to 90°, all frame potentials are zero. The potential of the auxiliary frame has thereby slowly fallen away from zero while the potential of the double frame has passed through a maximum at 45°. In the following quarter cycle of turning, the phase of both potentials will be reversed, and the potential of the auxiliary frame reaches at 180° its negative maximum, while the potential of the double frame after passing over a negative maximum will again be zero at 180°. The conditions during the following half cycle can be readily seen from the figure. The line and the ellipse, respectively, of the Braun tube will be in the vertical position if the two main frames do not supply potentials, while the potential of the auxiliary frame has a maximum. As seen from Fig. 3, this condition is obtained at 0°. At 90°, both deviation potentials are zero, so that the Braun tube shows a point only and thus no substantial deviation. At the angles between 0° and 90°, the line on the screen of the Braun tube will be turned to the right. At 180° the line is again in the vertical position, and while it has moved into this position from the right in the vicinity of 0°, it now passes into the vertical position from the left, the reason for which lies in the phase jump of the potential at the 90° angle. At 270° the deviation disappears again and at 360° the initial position has again been resumed. It will thus be seen that for the reading it is only the two frame positions 0° and 180° which are to be considered, and that at these positions the correct angle of bearing can be easily determined by observing whether the zero position, i. e., the vertical position of the line, is assumed at the movement from the right or from the left. Generally, as the correct bearing minimum, the minimum position is chosen at which the line turns in the same sense as the frame.

The Braun tube or the dynamometer may be so constructed that the direction finder will be moved automatically into the correct minimum. Such an arrangement can be readily built on the basis of known arrangements. Furthermore, the present invention is not limited to a special construction of a Braun tube, but may also be employed with tubes having magnetic deviation coils, etc. The dynamometer may likewise be substituted by any other arrangement used for measuring the relative phase relations and amplitude relations of the two output potentials of the receiver.

I claim as my invention:

1. In a direction finder the combination which includes a pair of directional antennas and an auxiliary directional antenna, said antennas being rotatably mounted and having similar directional characteristics, an indicator having separate control means for causing a resultant deflection, means for applying the output potential from said auxiliary antenna to one of said control means, and means for applying the difference of the output potentials from said pair of antennas to the other of said control means.

2. In a direction finder the combination which includes a pair of directional antennas and an auxiliary directional antenna, said antennas being rotatably mounted and having similar directional characteristics, a cathode ray indicator having vertical and horizontal deflecting means, means for applying the output potential from said auxiliary antenna to one of said deflecting means, and means for applying the difference of the output potentials from said pair of antennas to the other of said deflecting means.

3. In a direction finder the combination which includes a pair of frame antennas and an auxiliary frame antenna mounted in parallel planes and adapted to rotate about a common axis, an indicator having separate control means for causing a resultant deflection, means for applying the output potential of said auxiliary frame antenna to one of said control means, and means for applying the difference of the output potentials from said pair of frame antennas to the other of said control means.

4. In a direction finder the combination which includes a pair of directional antennas and an auxiliary directional antenna, said antennas being rotatably mounted and having similar directional characteristics, a pair of receivers, means for applying the output potentials of said pair of antennas in phase opposition to one of said receivers, means for applying the output potential of said auxiliary antenna to the other of said receivers, an indicator, means for connecting the output of said receivers to said indicator, and means for adjusting the relative phase of the output potentials of said receivers.

5. In a direction finder the combination which includes a pair of loop antennas spaced and oriented in parallel planes to have similar directional characteristics when considered individually, an auxiliary loop antenna mounted intermediate the antennas of said pair and oriented in a plane parallel to the planes of said pair of antennas, said antennas being rotatable as a unit about an axis perpendicular to the line between said pair of antennas, a cathode ray indicator having vertical and horizontal deflecting means, means for applying the output potential from said auxiliary loop antenna to one of said deflecting means, and means for applying the difference of the output potentials from said pair of loop antennas to the other of said deflecting means.

6. In a radio direction finder a pair of spaced parallel similar loop antennas, a third loop antenna fixed parallel to the first pair, and a phase meter responsive to the outputs of the paired loops compounded in opposition and to the output of the reference loop.

7. In a direction finder the combination which includes a pair of directional antennas and an auxiliary directional antenna mounted in a row and all oriented in parallel planes to have similar directional characteristics when considered individually, said antennas being rotatable as a unit about an axis perpendicular to the line established by said row of antennas, a cathode ray indicator having vertical and horizontal deflecting means, means for applying the output potential from said auxiliary antenna to one of said deflecting means, and means for applying the difference of the output potentials from said pair of antennas to the other of said deflecting means.

8. In a direction finder the combination which includes a pair of loop antennas and an auxiliary loop antenna mounted in a row and all oriented in parallel planes to have similar directional characteristics when considered individually, said antennas being rotatable as a unit about an axis perpendicular to the line established by said row of antennas, an indicator having separate control means for causing a resultant deflection, means for applying the output potential of said auxiliary loop antenna to one of said control means, and means for applying the difference of the output potentials from said pair of loop antennas to the other of said control means.

WILHELM RUNGE.